※United States Patent Office 3,406,180
Patented Oct. 15, 1968

3,406,180
ADAMANTANYL THIOSEMICARBAZONES
Stephen Sallay, Montgomery, and Scott J. Childress, Philadelphia, Pa., assignors to American Home Products Corporation, New York, N.Y., a corporation of Delaware
No Drawing. Continuation-in-part of application Ser. No. 495,690, Oct. 13, 1965. This application Oct. 20, 1966, Ser. No. 587,985
11 Claims. (Cl. 260—325)

ABSTRACT OF THE DISCLOSURE

This invention relates to new adamantanyl thiosemicarbazones. The compounds are useful as antagonists of Herpes Simplex and Vaccinia viruses.

---

This is a continuation-in-part of U.S. Ser. No. 495,690, filed Oct. 13, 1965, now abandoned.

This invention relates to new and useful adamantane derivatives as well as to a novel method for their preparation. In particular, the present invention is concerned with adamantane thiosemicarbazides and adamantane thiosemicarbonazones having pharmacodynamic activity.

The novel compounds which are included within the scope of this invention are represented by the following formula:

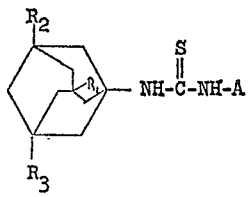

wherein $R_1$, $R_2$ and $R_3$ are selected from the group consisting of hydrogen and methyl with the proviso that at least one of said substituents shall be hydrogen; A is selected from the group consisting of amino and

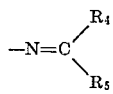

wherein $R_4$ and $R_5$ are both selected from the group consisting of hydrogen, phenyl and lower alkyl with the proviso that when $R_4$ is hydrogen, $R_5$ is selected from the group consisting of phenyl and lower alkyl and when $R_4$ and $R_5$ are taken together with the carbon atom to which they are attached, form a moiety selected from the group consisting of cyclopentylidene, cyclohexylidene, 2-oxo-3-indolinylidene and 1-lower alkyl-2-oxo-3-indolinylidene.

The new compounds of the aforesaid formula where A is amino are properly called "adamantanyl thiosemicarbazides." Special examples thereof are: 4-(1-adamantanyl) - 3 - thiosemicarbazide and 4-(3-methyl-1-adamantanyl-3-thiosemicarbazide. Alternatively, when A is —N=CR₄R₅, the compounds are called "adamantanyl thiosemicarbazones" such as, 2-butanone-[4-(1-adamantanyl)] - 3 - thiosemicarbozone and indole-2,3-dione-3-[4-(1-adamantanyl)-3-thiosemicarbazone].

In accord with the process of the present invention, the novel thiosemicarbazone compounds of this invention may be prepared by the reaction of an also novel thiosemicarbazide of the formula:

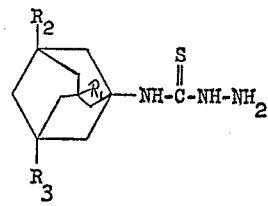

where $R_1$, $R_2$ and $R_3$ have the same meaning as previously set forth, with a ketone of the formula $R_4COR_5$ where $R_4$ and $R_5$ are as previously defined. The reaction is conducted in a lower alkanol, at a temperature that is in the range from about 35° C. to about 120° C. for a period of from about one to about five hours. Preferably, this reaction is conducted at the reflux temperature of the reaction mixture for a period of one to two hours. These time and temperature ranges are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By a lower alkanol as employed herein is meant an organic alcohol containing from one to seven carbon atoms, such as, methanol, ethanol and hexanol. The amount of alkanol solvent used is not critical, it being only necessary to use sufficient solvent to provide a reaction medium for the reactants.

After the reaction is complete, the reaction mixture is cooled, and the product is obtained by conventional methods, for example filtration and recrystallization from acetone or methyl ethyl ketone.

The majority of the reactants employed in the process of this invention are known compounds which are readily available from commercial sources, while the remainder can either be prepared in accordance with standard organic procedures well known to those skilled in the art or by known published procedures. The methyl substituted adamantanes utilized as procursors for the reactants of the process of this invention are prepared by the method described by Fort and Schleyer in Chem. Rev. 64, 277, (1964). These precursors are converted to their corresponding 1-amino-adamantanes by the reaction described by Stetter and Wulff in Ber., 95, 2303 (1962), while the related isothiocyanates may be prepared by the process described by Stetter et al. in Ber., 93, 226 (1960). The novel thiosemicarbazides of the present invention are synthesized by the reaction of hydrazine with an appropriate above prepared adamantanyl isothiocyanate.

In accord with the present invention, the new adamantanyl thiosemicarbazides and adamantanyl thiosemicarbazones herein described have been found to possess interesting pharmaceutical properties which render them useful as synthetic medicinals. More particularly, these compounds, in standard pharmacological tests, have exhibited utility as antiviral agents against herpes simplex and vaccinia viruses. Further, the adamantanyl thiosemicarbazides have demonstrated utility as intermediates in the synthesis of the novel thiosemicarbazones of the present invention.

3

When the compounds of this invention are employed as antiviral agents against herpes simplex and vaccinia viruses they may be administered alone or in combination with pharmaceutically acceptacle carriers, the proportion of which is determined by the solubility and chemical nature of the compound, chosen route of administration and standard pharmaceutical practice. For example, they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of parenteral administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 0.1 mg. to about 20.0 mg. per kg. of body weight per day, although as aforementioned variations will occur. However, a dosage level that is in the range of from about 1.0 mg. to about 10.0 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 1-aminodamantane hydrochloride (2.3 g.) is added to a solution of potassium hydroxide (1.6 g.) in 20 ml. of 50 percent ethanol. The reaction mixture is cooled and then treated with 1 ml. of carbon disulfide. After one hour, the homogeneous solution is treated with 1.4 g. of the sodium salt of chloroacetic acid and stored at room temperature overnight. The bulk of the ethanol is removed by evaporation and the cooled reaction mixture is acidified. The 1-adamantanyl isothiocyanate precipitate is separated by filtration and recrystallized from ethanol, M.P. 165–7° C. and the IR spectrum possesses the characteristic isocyanate bands between 4.75–4.90µ.

EXAMPLE II

Eight grams (8.0 g.) of 1-adamantanyl isothiocyanate are dissolved in a mixture of 100 ml. of 50 percent ethanol and 20 ml. of hydrazine hydrate and the mixture is refluxed for three hours. Thereafter, the reaction mixture is cooled and the precipitated product collected by filtration and recrystallized from ethanol. In this manner, is obtained 4-(1-adamantanyl)-3-thiosemicarbazide; M.P. 212.5–213° C.

Analysis.—Calc'd. for $C_{11}H_{19}N_3S$: C, 58.64; H, 8.50; N, 18.65. Found: C, 58.57; H, 8.16; N, 18.49.

In a similar manner, starting with an appropriate isothiocyanate, the following thiosemicarbazides are prepared:

4-(3-methyl-1-adamantanyl)-3-thiosemicarbazide;
4-(3,5-dimethyl-1-adamantanyl)-3-thiosemicarbazide.

EXAMPLE III 1.3 grams of 2,3-indolinedione and 1.9 grams of 4-(1-adamantanyl)-3-thiosemicarbazide are added to 150 ml. of methanol and the mixture is refluxed for one hour. Subsequently, the precipitated product is filtered from the cooled reaction mixture and recrystallized from methyl ethyl ketone. In this manner are obtained 1.6 grams of yellow, crystalline indole - 2,3 - dione - 3 - [4-(1-adamantanyl)-3-thiosemicarbazone], M.P. 279–280° C. (dec.).

4

Analysis.—Calc'd. for $C_{19}H_{22}ON_4S$: C, 64.38; H, 6.26; N, 15.81; S, 9.04. Found: C, 64.38; H, 6.13; N, 15.67; S, 8.80.

yellow, crystalline indode - 2,3 - dione-3[4-(1-adamantanyl)-3-thiosemicarbazone] and indole - 2,3-dione-3-[4-(3,5 - dimethyl-1-adamantanyl)-3-thiosemicarbazone] are synthesized.

EXAMPLE IV

A mixture containing 2.6 grams of 1-methyl-indoline-2,3-dione and 3.8 grams of 4-(1-adamantanyl)-3-thiosemicarbazide in 300 ml. of ethanol is heated to 50° C. for two hours. Thereafter, the precipitate is separated by filtration and recrystallized from methyl ethyl ketone. In this manner, is obtained 1-methyl-indole-2,3-dione-3-[4-(1-adamantanyl)-3-thiosemicarbazone], M.P. 258–259° C. (dec.).

Analysis.—Calc'd. for $C_{20}H_{24}ON_4S$: C, 65.19; H, 6.56; N, 15.20; S, 8.68. Found: C, 65.08; H, 6.19; N, 15.07; S, 8.60.

EXAMPLE V

The procedure of Example IV is repeated reacting the following ketones and adamantanyl thiosemicarbazides to produce the hereinafter listed products:

| Starting materials | Product |
|---|---|
| 1-ethyl-indoline-2,3-dione and 4-(3-methyl-1-adamantanyl)-3-thiosemicarbazide. | 1-ethyl-indole-2,3-dione-3-[4-(3-methyl-1-adamantanyl)-3-thiosemicarbazone]. |
| 1-butyl-indoline-2,3-dione and 4-(3-methyl-1-adamantanyl)-3-thiosemicarbazide. | 1-butyl-indole-2,3-dione-3-[4-(3-methyl-1-adamantanyl)-3-thiosemicarbazone]. |
| 1-amyl-indoline-2,3-dione and 4-(3,5-dimethyl-1-adamantanyl)-3-thiosemicarbazide. | 1-amyl-indole-2,3-dione-3-[4-(3,5-dimethyl-1-adamantanyl)-3-thiosemicarbazone]. |
| 1-isopropyl-indoline-2,3-dione and 4-(3,5-dimethyl-1-adamantanyl)-3-thiosemicarbazide. | 1-isopropyl-indole-2,3-dione-3-[4-(3,5-dimethyl-1-adamantanyl)-3-thiosemicarbazone]. |
| Cyclohexanone and 4-(1-adamantanyl)-3-thiosemicarbazide. | Cyclohexanone-3-[4-(1-adamantanyl)-3-thiosemicarbazone]. |
| Cyclohexanone and 4-(3-methyl-1-adamantanyl)-3-thiosemicarbazide. | Cyclohexanone-3-[4-(3-methyl-1-adamantanyl)-3-thiosemicarbazone]. |
| Cyclopentanone and 4-(3,5-dimethyl-1-adamantanyl)-3-thiosemicarbazide. | Cyclopentanone-3-[4-(3,5-dimethyl-1-adamantanyl)-3-thiosemicarbazone]. |
| Cyclopentanone and 4-(3-methyl-1-adamantanyl)-3-thiosemicarbazide. | Cyclopentanone-3-[4-(3-methyl-1-adamantanyl)-3-thiosemicarbazone]. |

EXAMPLE VI

One gram of methyl ethyl ketone and two grams of 4-(1-adamantanyl)-3-thiosemicarbazide are added to 125 ml. of butanol and the mixture is refluxed for one hour. Subsequently, the precipitate is filtered from the reaction mixture and recrystallized from methanol. In this manner, 2 - butanone - [4 - (1-adamantanyl)]-3-thiosemicarbazone is obtained, M.P. 129–130° C.

Analysis.—Calc'd. for $C_{12}H_{25}N_3S$: C, 64.48; H, 9.02; N, 15.04; S, 11.45. Found: C, 64.25; H, 8.80; N, 15.22; S, 11.50.

Similarly, by reacting methyl ethyl ketone with 4-(3-methyl-1-adamantanyl)-3-thiosemicarbazide, there is obtained 2-butanone-[4-(3-methyl-1-adamantanyl)]-3-thiosemicarbazone.

EXAMPLE VII

To 0.5 gram of benzaldehyde in 100 ml. of methanol there is added 1.0 gram of 4-(1-adamantanyl)-3-thiosemicarbazide and the mixture is heated to 40° for five hours. Thereafter, the precipitated thiosemicarbazone is separated by filtration and recrystallized from benzene. In this manner, is obtained benzaldehyde-4-(1-adamantanyl)-3-thiosemicarbazone, M.P. 201–202° C.

Analysis.—Calc'd. for $C_{18}H_{23}N_3S$: C, 68.98; H, 7.40; N, 13.41. Found: C, 69.16; H, 7.36; N, 13.36.

EXAMPLE VIII

To 1.0 gram of benzophenone in 75 ml. of butanol there are added 2.0 grams of 4-(1-adamantanyl)-3-thiosemicarbazide and the mixture is heated to 55° C., for three hours. Thereafter, the precipitated product is separated by filtration and recrystallized from benzene. In this manner, is obtained benzophenone-4-(1-adamantanyl)-3-thiosemicarbazone.

In a similar manner, reacting benzophenone with 4-(3-methyl-1-adamantanyl)-3-thiosemicarbazide there is obtained benzophenone-4-(3-methyl-1-adamantanyl)-3-thiosemicarbazone.

EXAMPLE IX

The procedure of the above Examples VI to VIII is repeated to prepare the following thiosemicarbazones from the corresponding starting compounds, 3-hexanone-[4-(3-methyl-1-adamantanyl)]-3-thiosemicarbazone;
2-octanone-[4-(3,5-dimethyl-1-adamantanyl)]-3-thiosemicarbazone;
6-hexadecanone-[4-(3-methyl-1-adamantanyl)]-3-thiosemicarbazone;
2-propanone-[4-(1-adamantanyl)]-3-thiosemicarbazone;
3-pentanone-[4-(3,5-dimethyl-1-adamantanyl)]-3-thiosemicarbazone;
1-butanone-1-phenyl-[4-(1-adamantanyl)]-3-thiosemicarbazone.

What is claimed is:
1. A compound selected from the group consisting of those having the formula:

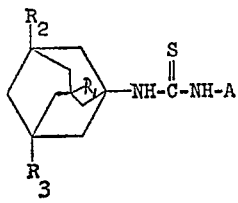

wherein $R_1$, $R_2$ and $R_3$ are selected from the groups consisting of hydrogen and methyl with the proviso that at least one of said substituents shall be hydrogen; A is selected from the group consisting of amino and

wherein $R_4$ and $R_5$ are both selected from the group consisting of hydrogen, phenyl and lower alkyl with the proviso that when $R_4$ is hydrogen, $R_5$ is selected from the group consisting of phenyl and lower alkyl and when $R_4$ and $R_5$ are taken together with the carbon atom to which they are attached from a moiety selected from the group consisting of cyclopentylidene, cyclohexylidene, 2-oxo-3-indolinylidene and 1-lower alkyl-2-oxo-3-indolinylidene.

2. A compound as described in claim 1 which is: 4-(1-adamantanyl)-3-thiosemicarbazide.

3. A compound as described in claim 1 which is: indole-2,3-dione-3-[4-(3-methyl - 1 - adamantanyl)-3-thiosemicarbazone].

4. A compound as described in claim 1 which is: 1-methyl-indole-2,3-dione - 3 - [4-(3,5-dimethyl-1-adamantanyl)-3-thiosemicarbazone].

5. A compound as described in claim 1 which is: 3-pentanone-[4 - (3,5-dimethyl - 1 - adamantanyl)-3-thiosemicarbazone].

6. A compound as described in claim 1 which is: benzophenone-4-(1-adamantanyl)-3-thiosemicarbazone.

7. A compound selected from the group consisting of those having the formula:

wherein $R_1$ and $R_2$ are both selected from the group consisting of hydrogen, phenyl and lower alkyl with the proviso that when $R_1$ is hydrogen, $R_2$ is selected from the group consisting of phenyl and lower alkyl, and when $R_1$ and $R_2$ are taken together with the carbon atom to which they are attached form a moiety selected from the group consisting of cyclopentylidene, cyclohexylidene, 2-oxo-3-indolinylidene and N-lower-alkyl-2-oxo-3-indolinylidene.

8. A compound as described in claim 7 which is: indole-2,3-dione-3-[4-(1 - adamantanyl) - 3 - thiosemicarbazone].

9. A compound as described in claim 7 which is: 1-methyl-indole-2,3-dione - 3 - [4-(1-adamantanyl)-3-thiosemicarbazone].

10. A compound as described in claim 7 which is: 2-butanone-[4-(1-adamantanyl)-3-thiosemicarbazone].

11. A compound as described in claim 7 which is: benzaldehyde-4-(1-adamantanyl)-3-thiosemicarbazone.

References Cited

UNITED STATES PATENTS 3,253,991   5/1966   Bauer et al. _____ 167—65

NICHOLAS S. RIZZO, *Primary Examiner.*

J. A. NARCAVAGE, *Assistant Examiner.*